(12) United States Patent
Kawakami

(10) Patent No.: US 7,405,026 B2
(45) Date of Patent: Jul. 29, 2008

(54) LIQUID CRYSTAL COMPOSITION

(75) Inventor: Shotaro Kawakami, Oosato-gun (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 328 days.

(21) Appl. No.: 10/549,143

(22) PCT Filed: Mar. 17, 2004

(86) PCT No.: PCT/JP2004/003574

§ 371 (c)(1), (2), (4) Date: Sep. 15, 2005

(87) PCT Pub. No.: WO2004/083340

PCT Pub. Date: Sep. 30, 2004

(65) Prior Publication Data

US 2006/0172089 A1 Aug. 3, 2006

(30) Foreign Application Priority Data

Mar. 20, 2003 (JP) ............................. 2003-077845

(51) Int. Cl.
*C09K 19/00* (2006.01)
*C09K 19/52* (2006.01)

(52) U.S. Cl. .................. 430/20; 430/270.1; 252/299.01; 428/1.1

(58) Field of Classification Search .............. 430/270.1, 430/20; 428/1.1; 252/299.01
See application file for complete search history.

(56) References Cited

U.S. PATENT DOCUMENTS

| 5,536,442 | A | 7/1996 | Reiffenrath et al. ..... 252/299.01 |
| 6,793,983 | B1 | 9/2004 | Heckmeier et al. ........... 428/1.1 |
| 7,145,047 | B2 * | 12/2006 | Takehara et al. ............ 570/183 |

FOREIGN PATENT DOCUMENTS

| DE | 4023107 | 1/1992 |
| DE | 10122371 | 12/2001 |
| JP | 10-218825 | 8/1998 |
| JP | 11-286465 | 10/1999 |
| JP | 2002-53861 | 2/2002 |
| JP | 2002-220356 | 8/2002 |
| JP | 2002-533526 | 10/2002 |

* cited by examiner

*Primary Examiner*—Geraldina Visconti
(74) *Attorney, Agent, or Firm*—Edwards Angell Palmer & Dodge LLP

(57) ABSTRACT

A nematic liquid crystal composition includes at least one of liquid crystal compounds containing a trans-4-trifluoromethoxycyclohexyl group in a backbone, in which the number of an intramolecular cyclohexane ring is 2 to 4; at least one of compounds in which $\Delta\epsilon$ is less than 1 in absolute value; and at least one selected from liquid crystal compounds containing a naphthalene-2,6-diyl group, a decahydronaphthalene-2,6-diyl group, or a 1,2,3,4-tetrahydronaphthalene-2,6-diyl group in a backbone, in which $\Delta\epsilon$ is 1 or more in absolute value, and a liquid crystal compound in which the number of a six-membered ring is 2 to 4, and $\Delta\epsilon$ is 1 or more in absolute value.

16 Claims, 1 Drawing Sheet

LIQUID CRYSTAL COMPOSITION

TECHNICAL FIELD

The present invention relates to a liquid crystal composition, which is useful as a material for an electro-optical liquid crystal display element, and a liquid crystal display element using the same.

The present application claims priority on Japanese Patent Application No. 2003-077845 filed on Mar. 20, 2003, the entire contents of which are incorporated herein by reference.

BACKGROUND ART

In a liquid crystal display element such as a twisted nematic, super twisted nematic, or active matrix liquid crystal display element, specifically a medium or small sized liquid crystal display element for a cellular phone, display stability to environmental temperature during use is an essential factor, and liquid crystal materials has been desired with such a low driving voltage that electrical power consumption can be reduced while maintaining responsiveness, with a small frequency dependence of duty driving or a small dependence of an optical property on a driving voltage in a temperature range of −30 to 0° C. or 40 to 80° C. or on a steep driving voltage, and so on.

Specifically, a temperature range of a liquid crystalline phase, which is an absolute value of a difference between a lower temperature limit ($T_{\rightarrow N}$) and an upper temperature limit ($T_{N-I}$) of a liquid crystalline phase, is essential since outdoor use has become common because of the low electrical power consumption of a liquid crystal display element. Also, the demand for a reflective or semi-transmissive liquid crystal display element which does not require a backlight has increased for low electrical power consumption, and a liquid crystal material with a low birefringence has been desired to improve display characteristics.

In the present situation, however, a sufficiently low birefringence value required for a reflective or semi-transmissive liquid crystal display element using a combination of conventional materials has not been achieved, while it is possible to increase the temperature range of a liquid crystalline phase (see Patent Document 1). Therefore, the development of a liquid crystal composition with a sufficiently low birefringence without deteriorating the liquid crystal characteristics such as viscosity or threshold voltage, or the development of the best liquid crystal material for this purpose has been desired.

Meanwhile, a liquid crystal compound containing a trifluoromethoxy group is already known, and several compounds thereof and a liquid crystal composition using these compounds were disclosed (see Patent Documents 2 and 3). These Patent Documents 2 and 3 mention that it is possible for these compounds to be used as a nematic liquid crystal with an excellent co-solubility to liquid crystal compounds or compositions, a low viscosity enabling a quick response, a low threshold voltage enabling low voltage driving, a small birefringence, and a high voltage-holding ratio well enabling active matrix driving. However, Patent Documents 2 and 3 do not mention the specific constitutions for realizing a liquid crystal composition with an extremely small birefringence required for a reflective or semi-transmissive liquid crystal display element while sufficiently maintaining other liquid crystal characteristics.

Also, a liquid crystal composition with a small birefringence using a liquid crystal compound containing a trifluoromethoxy group is already known, and a preferable example thereof was disclosed (see Patent Document 4). However, since a lower temperature limit of a liquid crystalline phase is high, this composition cannot be used as a practical liquid crystal composition.

Therefore, the development of a nematic liquid crystal composition is desired with a small birefringence which is effective in a reflective or semi-transmissive liquid crystal display element and has excellent properties.

Patent Document 1: German Patent Application, Publication-No. 4023107 (see claim 1 on page 2)

Patent Document 2: Japanese Unexamined Patent Application, First Publication No. 2002-53861 (see page 8 to examples)

Patent Document 3: Japanese Unexamined Patent Application, First Publication No. Hei 10-218825 (see page 8 to examples)

Patent Document 4: Published Japanese Translation No. 2002-533526 of PCT (see example 7 on page 32)

An object of the present invention is to provide a nematic liquid crystal composition with a wide temperature range of a liquid crystalline phase, a low threshold voltage, a low viscosity, and a small birefringence. Also, another object of the present invention is to provide a display element using this liquid crystal composition as a constituent member, specifically having excellent quality for a reflective or semi-transmissive liquid crystal display element.

DISCLOSURE OF INVENTION

In the present invention, a liquid crystal compound is referred to as the following two compounds.

1: a liquid crystal compound showing liquid crystallinity alone

2: a compound showing no liquid crystallinity alone but showing liquid crystallinity when mixed with at least one of liquid crystal compounds, and having a structure in which a side chain is connected to the core consisting of a ring structure and a linkage group A liquid crystal composition of a first aspect of the present invention includes at least one of liquid crystal compounds containing a trans-4-trifluoromethoxycyclohexyl group in a backbone, in which the number of an intramolecular cyclohexane ring is 2 to 4; at least one of compounds in which $\Delta\epsilon$ is less than 1 in absolute value; and at least one selected from liquid crystal compounds containing a naphthalene-2,6-diyl group, a decahydronaphthalene-2,6-diyl group, or a 1,2,3,4-tetrahydronaphthalene-2,6-diyl group in a backbone, in which $\Delta\epsilon$ is 1 or more in absolute value, and a liquid crystal compound in which the number of a six-membered ring is 2 to 4, and $\Delta\epsilon$ is 1 or more in absolute value, wherein a birefringence is in the range of 0.05 to 0.1, a viscosity is 25 mPa·s or less at 20° C., a threshold voltage is 1.9 V or less at 25° C., and a difference between an upper temperature limit and a lower temperature limit of a liquid crystalline phase is 80° C. or more.

A liquid crystal display element of another aspect of the present invention is a liquid crystal display element using the aforementioned liquid crystal composition.

A nematic liquid crystal composition of the present invention has a broad temperature range of a liquid crystalline phase, a low threshold voltage, a low viscosity, and a small birefringence. The aforementioned liquid crystal composition can be used as a constituent member of an active matrix liquid crystal display element, specifically a reflective or semi-transmissive liquid crystal display element, thereby enabling to provide a display element with excellent display characteristics to be provided.

DETAILED DESCRIPTION OF THE INVENTION

Figure 1:
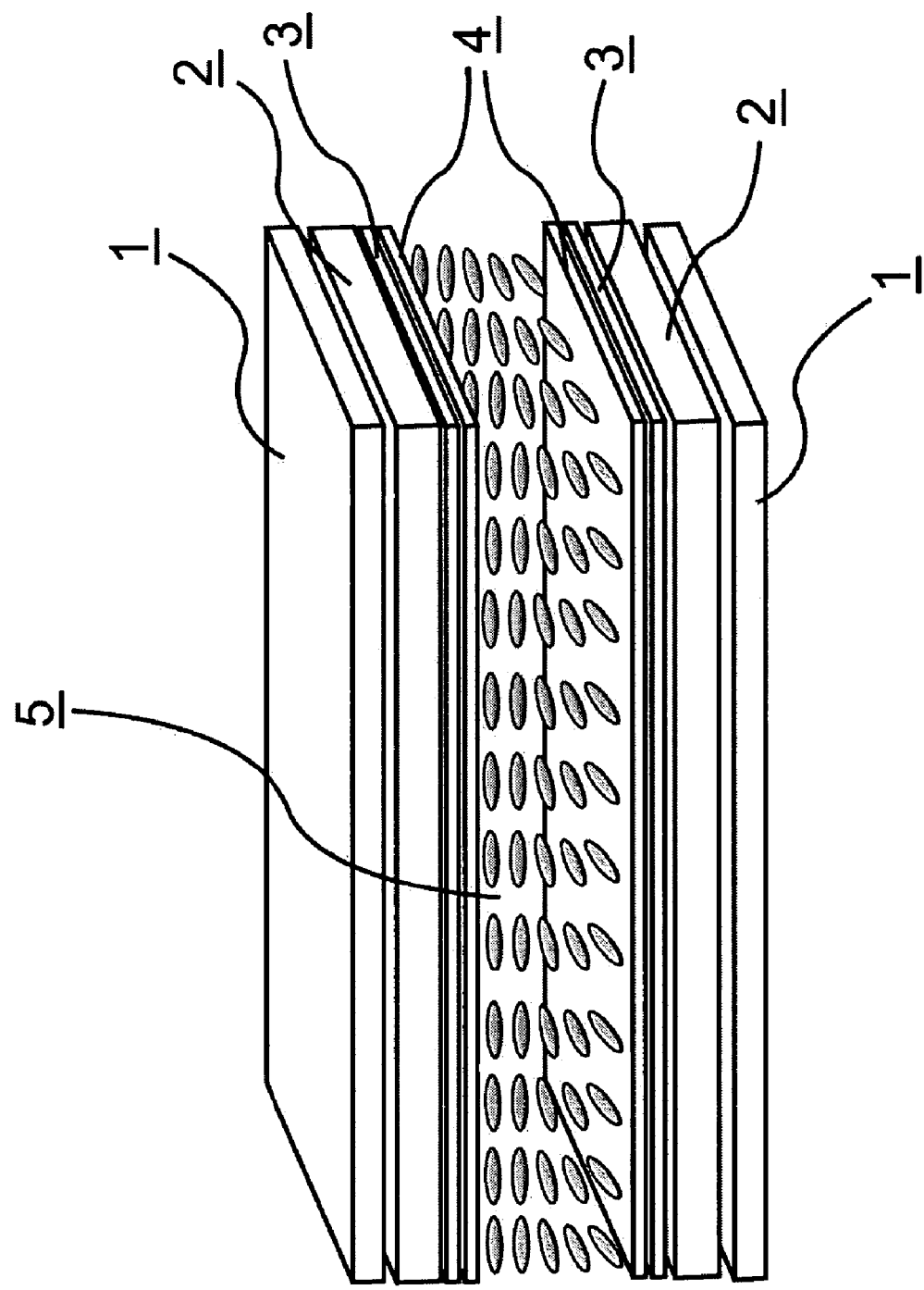
FIG. 1 is a magnified view illustrating an example of a liquid crystal display element of the present invention.

An embodiment of the present invention will hereinafter be described in more detail.

First Component

A nematic liquid crystal composition of the present invention includes, as a first component, at least one of liquid crystal compounds containing a trans-4-trifluoromethoxycyclohexyl group in a backbone, in which the number of an intramolecular cyclohexane ring is 2 to 4. Specifically, it is preferable to include the compounds represented by general formula (I) below as the first component:

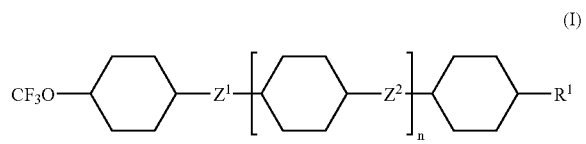

(I)

(wherein $R^1$ represents an alkyl group having 1 to 10 carbon atoms, an alkoxyl group having 1 to 10 carbon atoms, and an alkenyl group having 2 to 10 carbon atoms, or an alkenyloxy group having 2 to 10 carbon atoms, and $Z^1$ and $Z^2$ independently represent —COO—, —OCO—, —CH$_2$=CH$_2$—, —CH$_2$CH$_2$—, or a single bond, and n represents a number of 0 or 1).

In general formula (I), it is preferable that $R^1$ represents an alkyl group having 1 to 8 carbon atoms or an alkenyl group having 2 to 8 carbon atoms, and it is more preferable that the alkenyl group is among the structures of formulae (1) to (5) below:

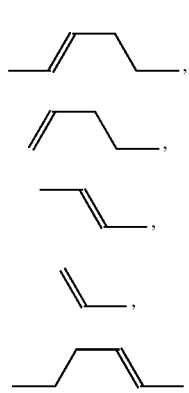

(1)
(2)
(3)
(4)
(5)

(Each structural formula is connected to a ring at the right end.).

It is preferable that $Z^1$ and $Z^2$ independently represent —CH$_2$=CH$_2$—, —CH$_2$CH$_2$—, or a single bond, and —CH$_2$CH$_2$— or a single bond is more preferable.

As the first component, the compounds represented by general formulae below are more preferable:

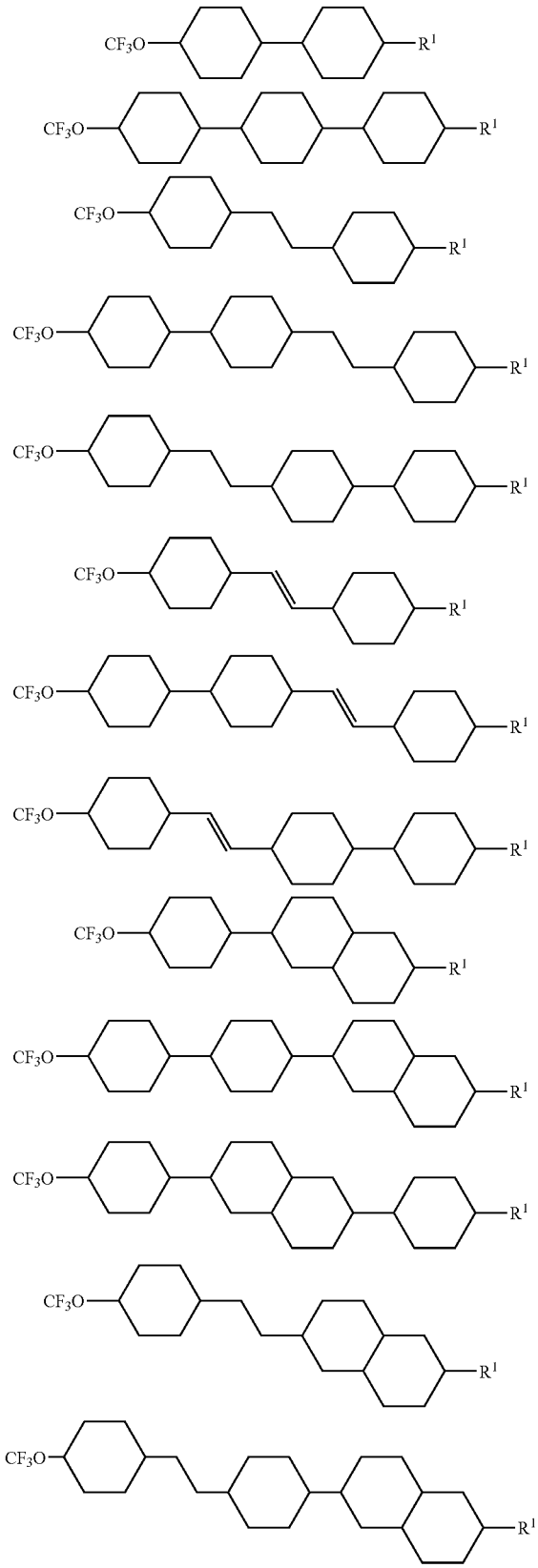

-continued

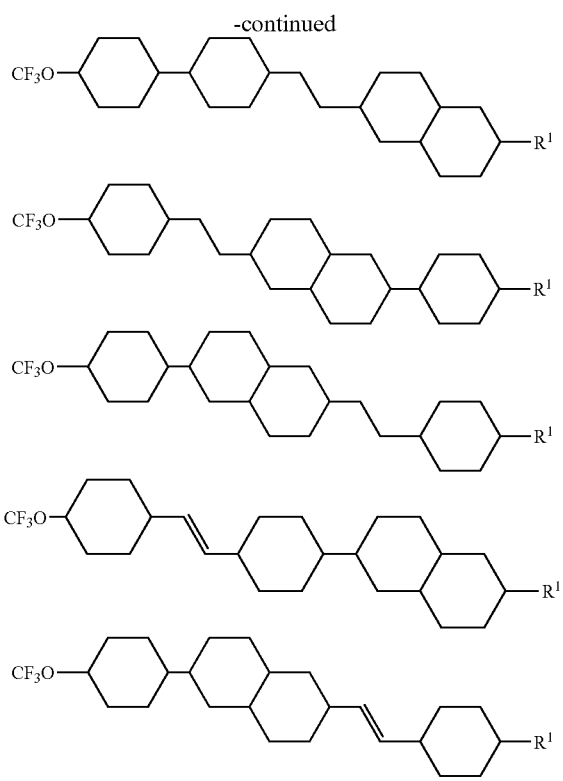

(wherein $R^1$ represents the same as in general formula (I)).

As the first component, general formulae below are particularly preferable:

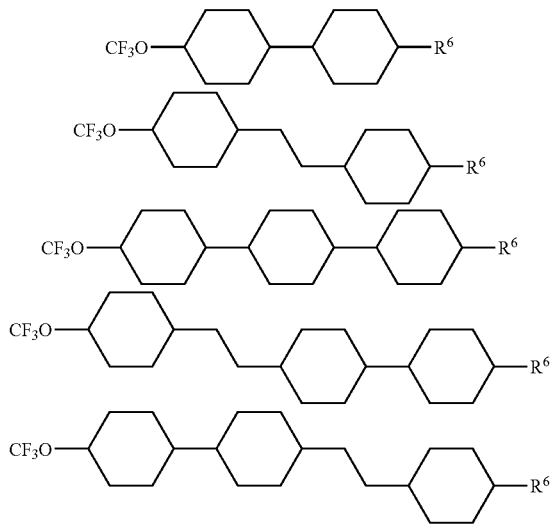

(wherein $R^6$ represents an alkyl group having 1 to 8 carbon atoms, an alkoxyl group having 1 to 8 carbon atoms, or an alkenyl group having 2 to 8 carbon atoms).

It is preferable that a nematic liquid crystal composition of the present invention includes 1 to 8 kinds of these compounds containing a trans-4-trifluoromethoxycyclohexyl group, and 1 to 6 kinds are more preferable, and 1 to 4 kinds are particularly preferable. Also, it is preferable that the content of these compounds is in the range of 5 to 50% by mass, and the range of 10 to 40% by mass is particularly preferable.

These compounds of the first component have an effect of increasing viscosity but also an effect of decreasing a threshold voltage, so it is preferable that the content of these compounds be low in terms of realizing a low viscosity, and that the content of these compounds be high in terms of realizing a low threshold voltage.

Second Component

A nematic liquid crystal composition of the present invention includes, as a second component, a compound in which $\Delta\epsilon$ is less than 1 in absolute value. Specifically, it is preferable to include the compounds represented by general formula (II) below as the second component:

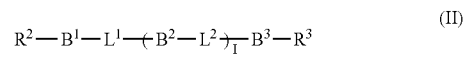

(wherein $R^2$ and $R^3$ independently represent a hydrogen atom, an alkyl group having 1 to 15 carbon atoms, an alkyl group having 1 to 15 carbon atoms substituted by at least one halogen, an alkenyl group having 2 to 15 carbon atoms, or an alkenyl group having 2 to 15 carbon atoms substituted by at least one halogen, in which one or two or more of a $CH_2$ group can independently be substituted by an oxygen atom, a sulfur atom, —CO—, —COO—, —OCO—, or —OCO—O— provided that oxygen atoms never connect to each other, $B^1$, $B^2$, and $B^3$ independently represent (a) a trans-1,4-cyclohexylene group (in which a $CH_2$ group or two or more non-adjacent $CH_2$ groups can be substituted by an oxygen atom or a sulfur atom)

(b) a 1,4-phenylene group (in which a $CH_2$ group or two or more non-adjacent $CH_2$ groups can be substituted by a nitrogen atom)

(c) a group selected from the group consisting of a 1,4-cyclohexenylene group, a 1,4-bicyclo(2.2.2)octylene group, a piperidine-1,4-diyl group, a naphthalene-2,6-diyl group, a decahydronaphthalene-2,6-diyl group, and a 1,2,3,4-tetrahydronaphthalene-2,6-diyl group, groups (a), (b), and (c) can be substituted by a halogen, l represents 0 or 1, and $L^1$ and $L^2$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond).

In general formula (II), it is preferable that $R^2$ and $R^3$ independently represent an unsubstituted straight-chain alkyl group having 1 to 10 carbon atoms or an unsubstituted straight-chain alkenyl group having 2 to 10 carbon atoms. An unsubstituted straight-chain alkyl group having 1 to 8 carbon atoms or an unsubstituted straight-chain alkenyl group having 2 to 6 carbon atoms is more preferable. It is particularly preferable that the alkenyl group is among the structures of formulae (1) to (5). Also, it is more preferable that $R^2$ and $R^3$ are different in the same molecule, while $R^2$ and $R^3$ can be the same or different.

It is preferable that $L^1$ and $L^2$ independently represent —COO—, —OCO—, —CH$_2$CH$_2$—, —CH=CH—, —C≡C—, —(CH$_2$)$_4$—, or a single bond, and —CH$_2$CH$_2$— or a single bond is more preferable.

It is preferable that $B^1$, $B^2$, and $B^3$ independently represent a trans-1,4-cyclohexylene group, a 1,4-phenylene group, a 3-fluoro-1,4-phenylene group, a 3,5-difluoro-1,4-phenylene group, or a decahydronaphthalene-2,6-diyl group. A trans-1,4-cyclohexylene group, a 1,4-phenylene group, or a decahydronaphthalene-2,6-diyl group is more preferable. A trans-1,4-cyclohexylene group is particularly preferable.

It is preferable that general formula (II) more specifically has any one of the structures represented by general formulae below:

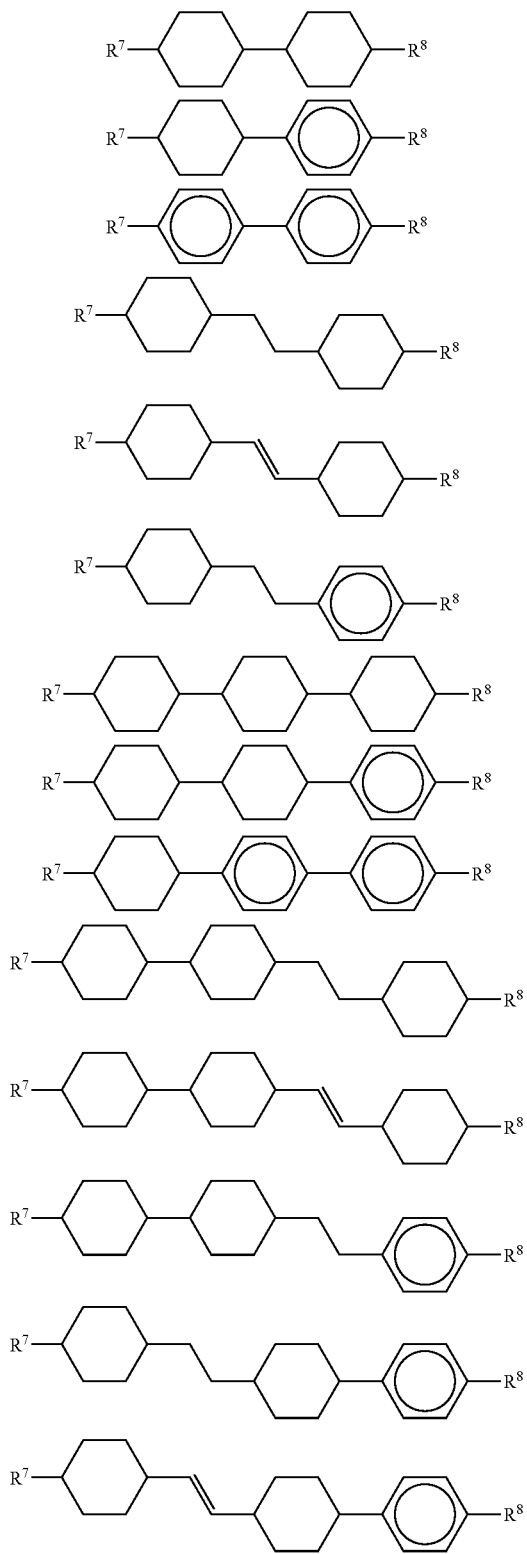

(wherein $R^2$ and $R^3$ independently represent an alkyl group or alkoxyl group having 1 to 8 carbon atoms, an alkenyl group having 2 to 8 carbon atoms, or an alkenyloxy group having 3 to 8 carbon atoms).

It is preferable that a nematic liquid crystal composition includes 1 to 12 kinds of these compounds in which Δε is less than 1 in absolute value, and 1 to 8 kinds are more preferable, and 1 to 6 kinds are particularly preferable. Also, it is preferable that the content of these compounds is in the range of 5 to 50% by mass.

These compounds of the second component have no effect of decreasing the threshold voltage but an effect of decreasing the viscosity, so it is preferable that the content of these compounds be high in terms of realizing a low viscosity, and that the content of these compounds be low in terms of realizing a low threshold voltage.

Third Component

A nematic liquid crystal composition of the present invention includes, as a third component, at least one selected from liquid crystal compounds containing a naphthalene-2,6-diyl group, a decahydronaphthalene-2,6-diyl group, or a 1,2,3,4-tetrahydronaphthalene-2,6-diyl group in a backbone, in which $\Delta\epsilon$ is 1 or more in absolute value; and a liquid crystal compound in which the number of a six-membered ring is 2 to 4, and $\Delta\epsilon$ is 1 or more in absolute value.

It is preferable to specifically include at least one of the compounds represented by general formulae (IIIa), (IIIb), and (IIIc) below as a compound containing a naphthalene-2,6-diyl group, a decahydronaphthalene-2,6-diyl group, and a 1,2,3,4-tetrahydronaphthalene-2,6-diyl group in a backbone, in which $\Delta\epsilon$ is 1 or more in absolute value:

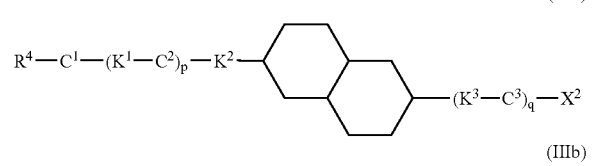

(IIIa)

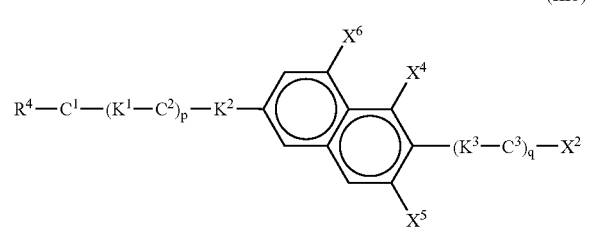

(IIIb)

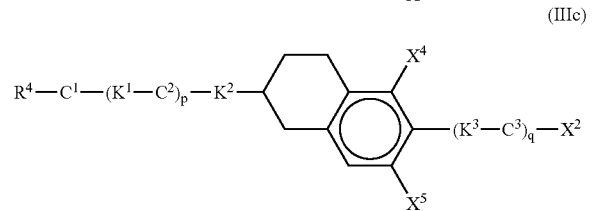

(IIIc)

(wherein $R^4$ represents an alkyl group having 1 to 10 carbon atoms, an alkoxyl group having 1 to 10 carbon atoms, and an alkenyl group having 2 to 10 carbon atoms, or an alkenyloxy group having 2 to 10 carbon atoms, and $C^1$, $C^2$, and $C^3$ independently represent (d) a trans-1,4-cyclohexylene group (in which a $CH_2$ group or two or more non-adjacent $CH_2$ groups can be substituted by an oxygen atom or a sulfur atom)

(e) a 1,4-phenylene group (in which a $CH_2$ group or two or more non-adjacent $CH_2$ groups can be substituted by a nitrogen atom)

(f) a group selected from the group consisting of a 1,4-cyclohexenylene group, a 1,4-bicyclo(2.2.2)octylene group, a piperidine-1,4-diyl group, a naphthalene-2,6-diyl group, a 1,2,3,4-tetrahydronaphthalene-2,6-diyl group, and a decahydronaphthalene-2,6-diyl group, groups (d), (e), and (f) can be substituted by a halogen, $K^1$, $K^2$, and $K^3$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond, $X^4$, $X^5$, and $X^6$ independently represent a hydrogen atom or a fluorine atom, p and q independently represent 0 or 1, and $X^2$ represents a hydrogen atom, a fluorine atom, a chlorine atom, a cyano group, a trifluoromethyl group, a difluoromethyl group, a fluoromethoxy group, a difluoromethoxy group, a trifluoromethoxy group, 2,2,2-trifluoroethyl group, or the same definition as $R^4$).

In general formulae (IIIa), (IIIb), and (IIIc), it is preferable that $R^4$ represents an unsubstituted straight-chain alkyl group having 1 to 15 carbon atoms or an unsubstituted straight-chain alkenyl group having 2 to 15 carbon atoms, and an unsubstituted straight-chain alkyl group having 1 to 8 carbon atoms or an unsubstituted straight-chain alkenyl group having 2 to 6 carbon atoms is more preferable, It is particularly preferable that the alkenyl group is among the structures of formulae (1) to (5).

It is preferable that $K^1$, $K^2$, and $K^3$ independently represent —COO—, —OCO—, —CH$_2$CH$_2$—, —CH=CH—, —C≡C—, —(CH$_2$)$_4$—, or a single bond, and —CH$_2$CH$_2$—, —CH=CH—, —(CH$_2$)$_4$—, or a single bond is more preferable, and —CH$_2$CH$_2$— or a single bond is particularly preferable. When there is a plurality of $K^1$, $K^2$, or $K^3$, it is preferable that at least one thereof is a single bond.

It is preferable that $C^1$, $C^2$, and $C^3$ independently represent a trans-1,4-cyclohexylene group, a 1,4-phenylene group, a 3-fluoro-1,4-phenylene group, or a 3,5-difluoro-1,4-phenylene group. A trans-1,4-cyclohexylene group or a 1,4-phenylene group is more preferable, and a trans-1,4-cyclohexylene group is particularly preferable.

It is preferable that $X^2$ represents a fluorine atom, a cyano group, a trifluoromethyl group, a difluoromethyl group, a fluoromethoxy group, a difluoromethoxy group, or a trifluoromethoxy group, and a fluorine atom is more preferable.

It is preferable that general formula (IIIa) is any one of the compounds represented by general formulae of the first and second groups below.

The first group is as follows:

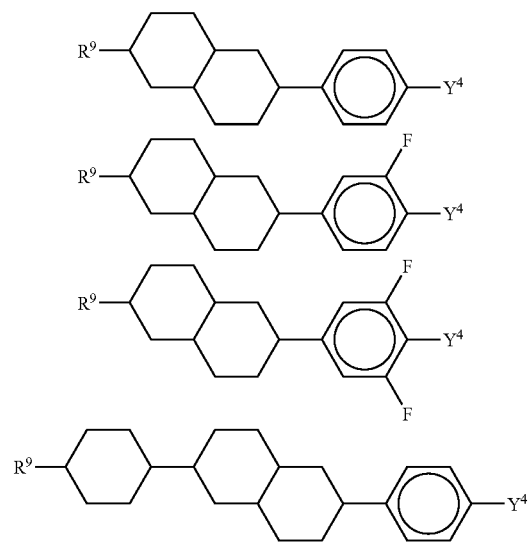

-continued

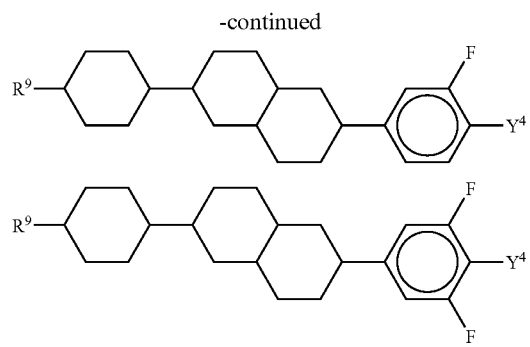

(wherein $R^9$ represents an alkyl group or an alkoxyl group having 1 to 8 carbon atoms or an alkenyl group having 2 to 8 carbon atoms, and $Y^4$ represents a cyano group, a fluorine atom, a chlorine atom, a trifluoromethyl group, a difluoromethoxy group, or a trifluoromethoxy group).

The second group is as follows:

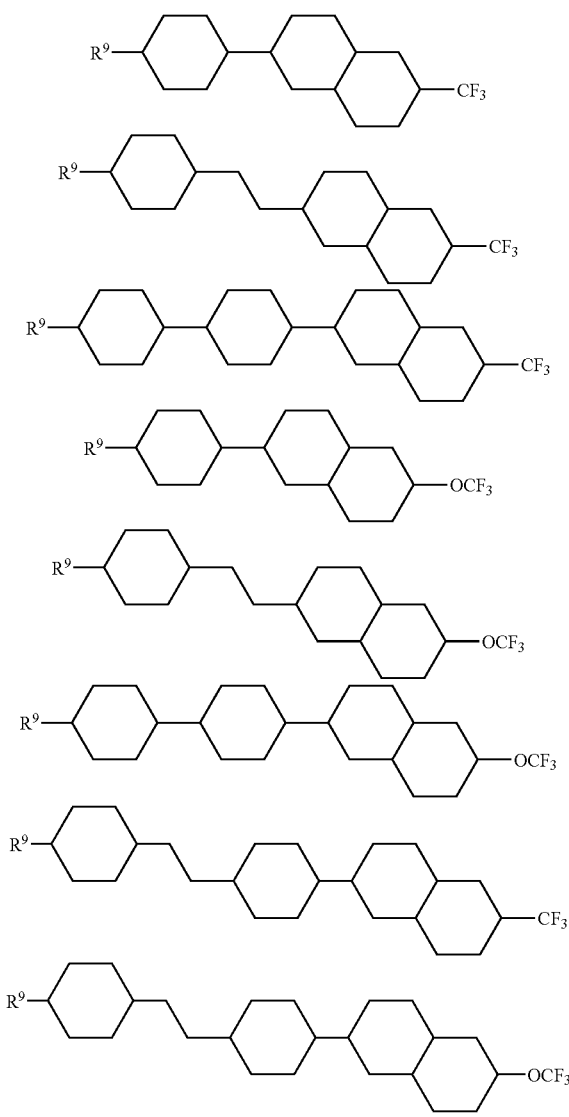

-continued

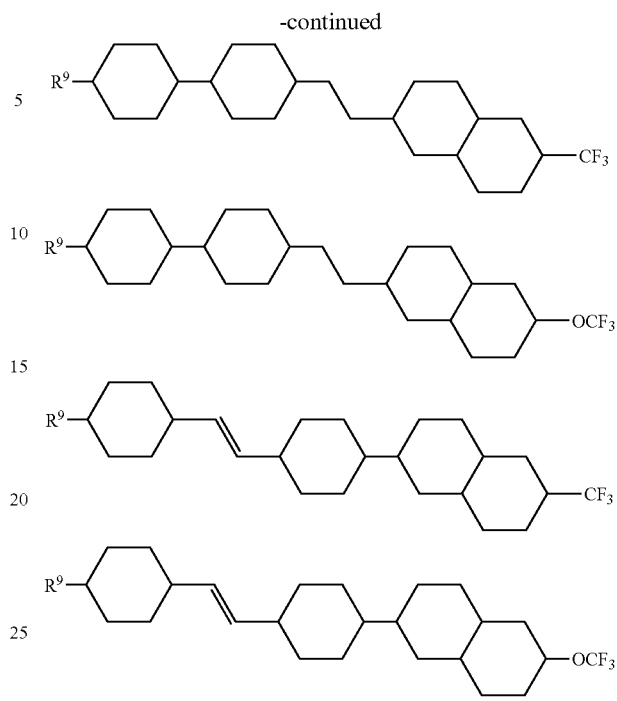

(wherein $R^9$ represents an alkyl group or alkoxyl group having 1 to 8 carbon atoms or an alkenyl group having 2 to 8 carbon atoms). It is preferable that general formula (IIIb) is any one of the compounds represented by general formulae below:

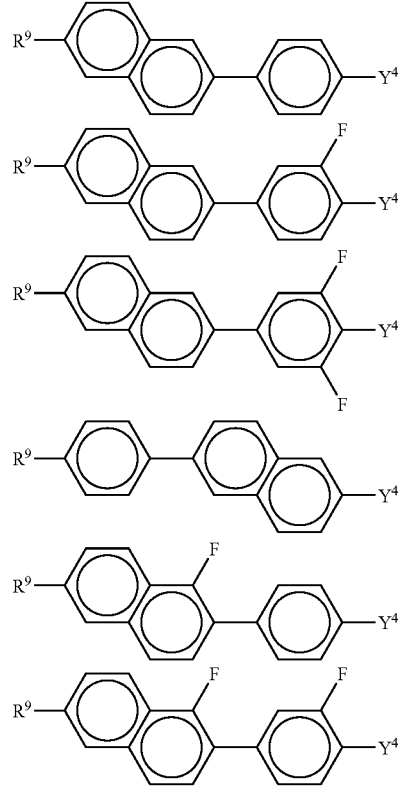

-continued
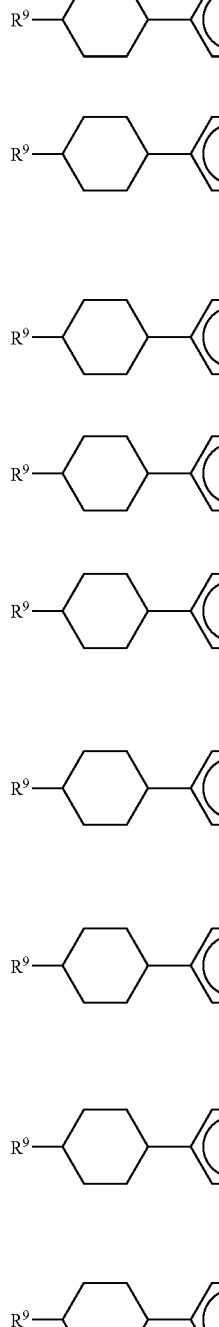

-continued

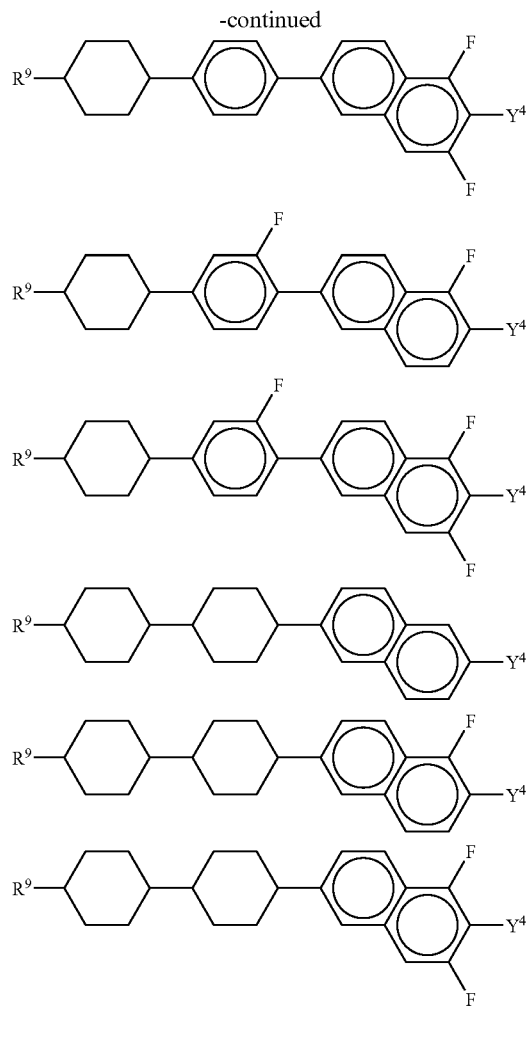

(wherein R⁹ represents an alkyl group or an alkoxyl group having 1 to 8 carbon atoms or an alkenyl group having 2 to 8 carbon atoms, and $Y^4$ represents a cyano group, a fluorine atom, a chlorine atom, a trifluoromethyl group, a difluoromethoxy group, or a trifluoromethoxy group).

It is preferable that general formula (IIIc) is any one of the compounds represented by general formulae below:

-continued

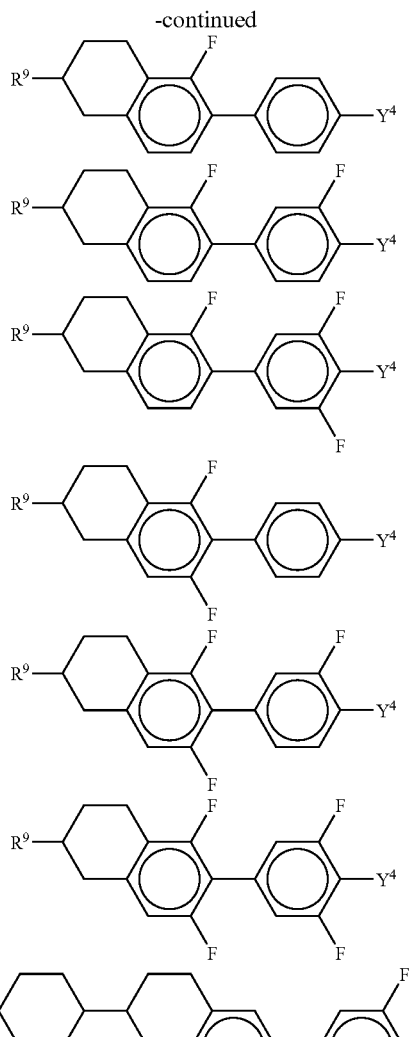

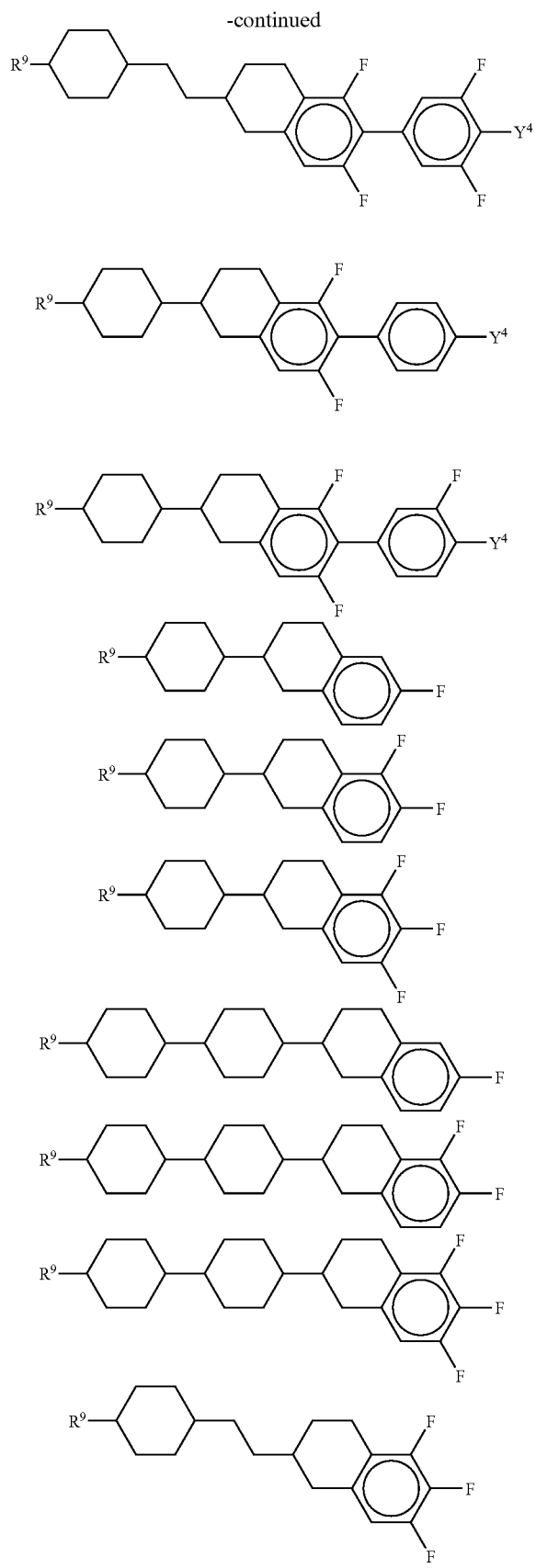

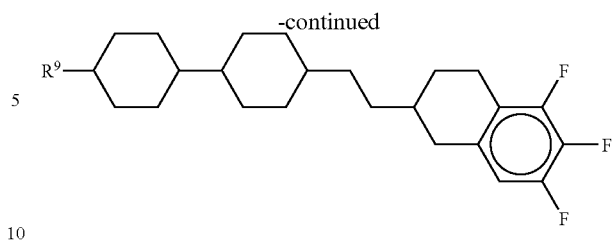

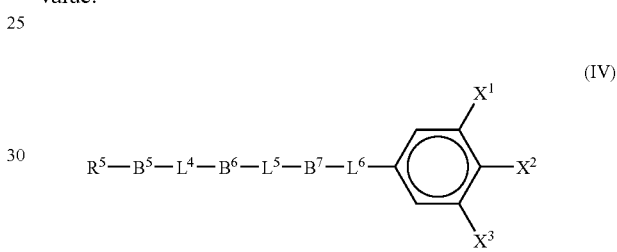

(wherein $R^9$ represents an alkyl group or an alkoxyl group having 1 to 8 carbon atoms or an alkenyl group having 2 to 8 carbon atoms, and $Y^4$ represents a cyano group, a fluorine atom, a chlorine atom, a trifluoromethyl group, a difluoromethoxy group, or a trifluoromethoxy group).

It is preferable that a nematic liquid crystal composition includes 1 to 12 kinds selected from the group consisting of the compounds represented by general formulae (IIIa), (IIIb), and (IIIc), and 1 to 6 kinds are more preferable.

It is preferable that a nematic liquid crystal composition includes a compound represented by general formula (IV) below as a compound in which Δε is 1 or more in absolute value:

$$R^5-B^5-L^4-B^6-L^5-B^7-L^6-\underset{X^3}{\overset{X^1}{\underset{\displaystyle}{\bigcirc}}}-X^2 \qquad (IV)$$

(wherein $R^6$ represents a hydrogen atom, an alkyl group having 1 to 15 carbon atoms, an alkyl group having 1 to 15 carbon atoms substituted by at least one halogen, an alkenyl group having 2 to 15 carbon atoms, or an alkenyl group having 2 to 15 carbon atoms substituted by at least one halogen, in which one or two or more of a $CH_2$ group can independently be substituted by an oxygen atom, a sulfur atom, —CO—, —COO—, —OCO—, or —OCO—O— provided that oxygen atoms never connect to each other, $B^5$, $B^6$, and $B^7$ independently represent a group selected from the group consisting of (g) a trans-1,4-cyclohexylene group (in which a $CH_2$ group or two or more non-adjacent $CH_2$ groups can be substituted by an oxygen atom or a sulfur atom) and (h) a 1,4-phenylene group (in which a $CH_2$ group or two or more non-adjacent $CH_2$ groups can be substituted by a nitrogen atom), groups (g) and (h) can be substituted by a cyano group and a halogen, and $L^4$, $L^5$, and $L^6$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond, $X^1$ and $X^3$ independently represent a hydrogen atom or a fluorine atom, and $X^2$ represents a hydrogen atom, a fluorine atom, a chlorine atom, a cyano group, a trifluoromethyl group, difluoromethyl group, fluoromethoxy group, a difluoromethoxy group, a trifluoromethoxy group, 2,2,2-trifluoroethyl group, or the same definition as $R^5$).

In general formulae (IV), it is preferable that $R^5$ represents an unsubstituted straight-chain alkyl group having 1 to 15 carbon atoms or an unsubstituted straight-chain alkenyl group having 2 to 15 carbon atoms, and an unsubstituted straight-chain alkyl group having 1 to 8 carbon atoms or an unsubstituted straight-chain alkenyl group having 2 to 6 carbon atoms is more preferable. It is particularly preferable that the alkenyl group is among the structures of formulae (1) to (5).

It is preferable that $L^4$, $L^5$, and $L^6$ independently represent —COO—, —OCO—, —CH$_2$CH$_2$—, —CH=CH—, —C≡C—, —(CH$_2$)$_4$—, or a single bond, and —CH$_2$CH$_2$—, —CH=CH—, —(CH$_2$)$_4$—, or a single bond is more preferable, and —CH$_2$CH$_2$— or a single bond is particularly preferable. It is preferable that at least two of $L^4$, $L^5$, and $L^6$ are a single bond.

It is preferable that $B^5$, $B^6$, and $B^7$ independently represent a trans-1,4-cyclohexylene group, a 1,4-phenylene group, a 3-fluoro-1,4-phenylene group, or a 3,5-difluoro-1,4-phenylene group. A trans-1,4-cyclohexylene group or a 1,4-phenylene group is more preferable, and a trans-1,4-cyclohexylene group is particularly preferable.

It is preferable that either $X^1$ or $X^3$ represents a fluorine atom.

It is preferable that $X^2$ represents a fluorine atom, a cyano group, a trifluoromethyl group, a difluoromethyl group, a fluoromethoxy group, a difluoromethoxy group, or a trifluoromethoxy group, and a fluorine atom is more preferable.

It is preferable that general formula (IV) is among the compounds represented by general formulae below:

It is preferable that a nematic liquid crystal composition includes 1 to 20 kinds selected from the group consisting of the compounds represented by general formulae (IIIa), (IIIb), (IIIc), and (IV), and 1 to 16 kinds are more preferable, and 1 to 12 kinds are particularly preferable. Also, it is preferable that the content of these compounds is in the range of 10 to 80% by mass.

These compounds have an effect of increasing the viscosity but also an effect of decreasing the threshold voltage, so it is preferable that the content of these compounds be high in terms of realizing a low threshold voltage, and that the content of these compounds be low in terms of realizing a low viscosity.

It is preferable that a nematic liquid crystal composition of the present invention includes a compound represented by general formula (Ia), a compound represented by general formula (II), a compound selected from the group consisting of the compounds represented by general formulae (IIIa), (IIIb), and (IIIc), and a compound represented by general formula (IV).

It is particularly preferable that a nematic liquid crystal composition includes a compound represented by general formula (Ia) whose content is 5 to 50% by mass; a compound represented by general formula (II) whose content is 5 to 50% by mass; a compound selected from the group consisting of the compounds represented by general formulae (IIIa), (IIIb), and (IIIc) whose content is 5 to 60% by mass; and a compound represented by general formula (IV) whose content is 5 to 50% by mass.

It is also preferable that a nematic liquid crystal composition includes, as an additional component, a compound represented by general formula (V-1) below:

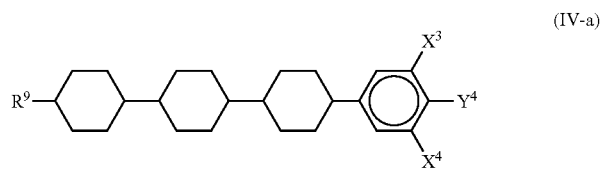

(IV-a)

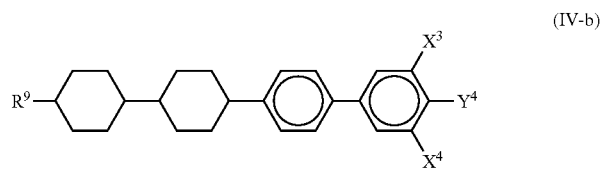

(IV-b)

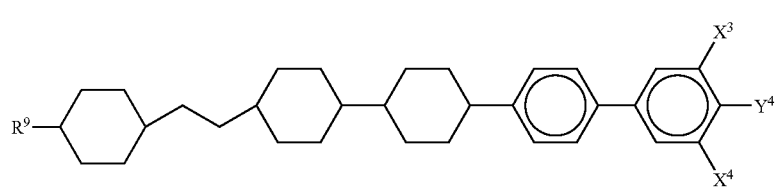

(IV-c)

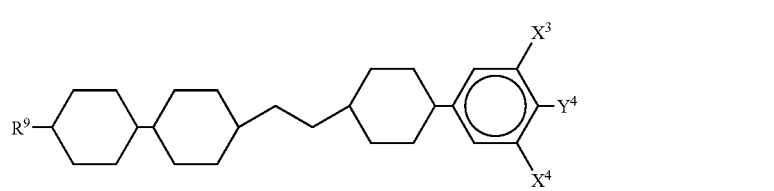

(IV-d)

(wherein $R^9$ represents an alkyl group or an alkoxyl group having 1 to 8 carbon atoms or an alkenyl group having 2 to 8 carbon atoms, and $X^3$ and $X^4$ independently represent a hydrogen atom or a fluorine atom, and $Y^4$ represents a cyano group, a fluorine atom, a chlorine atom, a trifluoromethyl group, a difluoromethoxy group, or a trifluoromethoxy group).

It is preferable that a nematic liquid crystal composition includes 1 to 8 kinds of the compounds represented by general formulae (IV), and 1 to 4 kinds are more preferable.

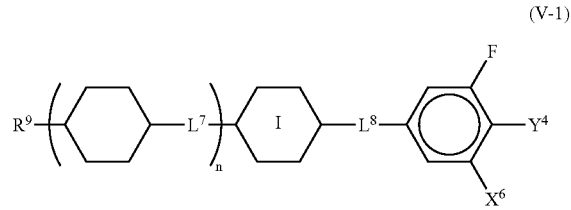

(V-1)

(wherein $R^9$ represents an alkyl group or an alkoxyl group having 1 to 8 carbon atoms or an alkenyl group having 2 to 8 carbon atoms, and $L^7$ and $L^8$ independently represent —$CH_2CH_2$—, —CH=CH—, —C≡C—, —$(CH_2)_4$—, or a single bond, and I represents a 1,4-phenylene group or a trans-1,4-cyclohexylene group, and $Y^4$ represents a cyano group, a fluorine atom, a chlorine atom, a trifluoromethyl group, a difluoromethoxy group, or a trifluoromethoxy group).

As a specific compound represented by general formula (V-1), compounds represented by general formulae below are preferable:

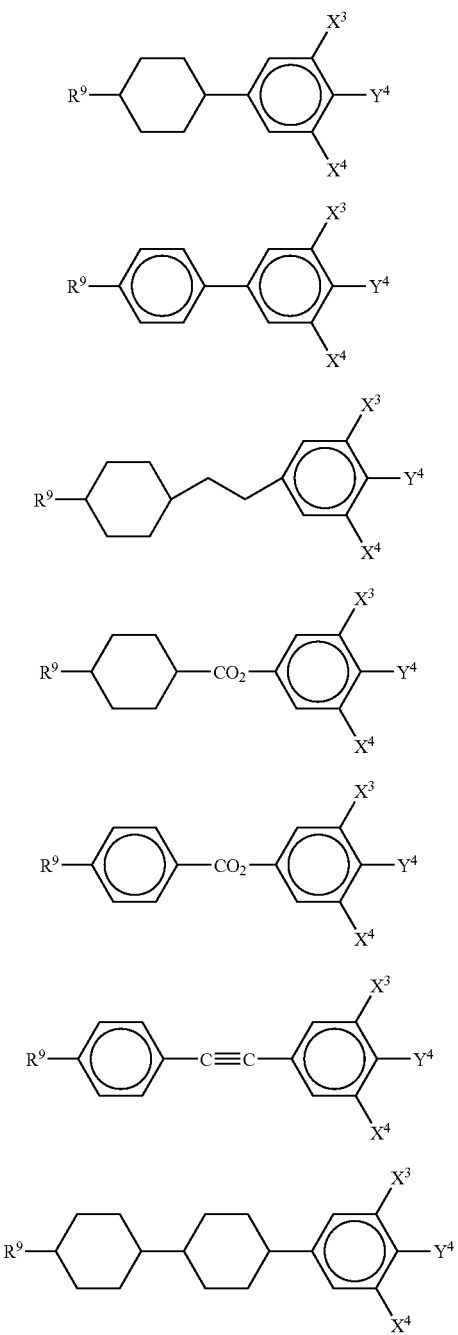

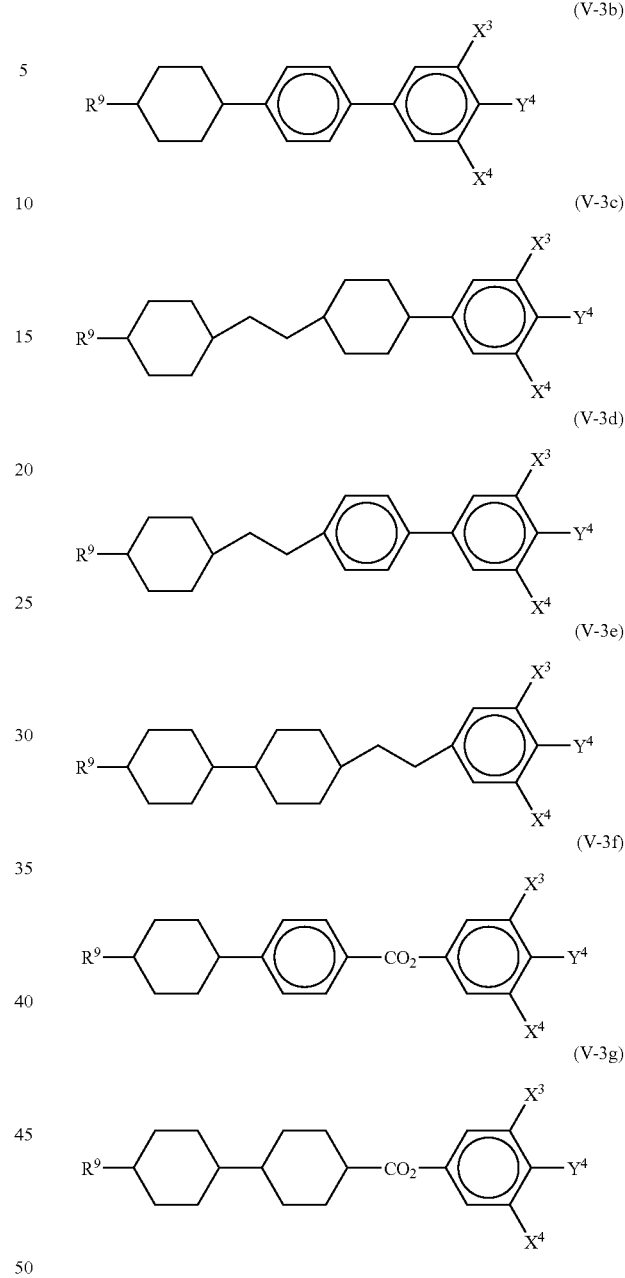

(wherein $R^9$ represents an alkyl group or an alkoxyl group having 1 to 8 carbon atoms or an alkenyl group having 2 to 8 carbon atoms, and $X^3$ and $X^4$ independently represent a hydrogen atom or a fluorine atom, and $Y^4$ represents a cyano group, a fluorine atom, a chlorine atom, a trifluoromethyl group, a difluoromethoxy group, or a trifluoromethoxy group).

A nematic liquid crystal composition of the present invention has a broad temperature range of a liquid crystalline phase (an absolute value of a difference between a lower temperature limit and an upper temperature limit of a liquid crystalline phase).

The temperature range of a liquid crystalline phase is preferably 80° C. or more, more preferably 90° C. or more, particularly preferably 100° C. or more. Also, the upper temperature limit of a liquid crystalline phase is preferably 70° C.

or more, more preferably 80° C. or more. Further, the lower temperature limit of a liquid crystalline phase is preferably −20° C. or less, more preferably −30° C. or less.

A nematic liquid crystal composition of the present invention has a low threshold voltage which is effective in a low voltage driving reducing electrical power consumption, a low viscosity which is effective in improving response rate, and a small birefringence which is effective in a reflective or semi-transmissive liquid crystal display element.

The threshold voltage of a nematic liquid crystal composition of the present invention at 25° C. is preferably 1.9 V or less, more preferably 1.7 V or less. The viscosity at 20° C. is preferably 25 mPa·s or less, more preferably 20 mPa·s or less. A birefringence at 25° C. is preferably in the range of 0.05 to 0.1, more preferably in the range of 0.05 to 0.09, more preferably in the range of 0.055 to 0.07.

A nematic liquid crystal composition of the present invention is useful for an active matrix liquid crystal display (AM-LCD) or a passive matrix type (super twisted) nematic liquid crystal display (STN-LCD), more useful for AM-LCD, and can be used for a semi-transmissive or reflective liquid crystal display element A nematic liquid crystal composition of the present invention can include, other than the aforementioned compounds, a common compound such as a nematic liquid crystal, a smectic liquid crystal, or a cholesteric liquid crystal.

FIG. 1 illustrates an example of a liquid crystal display element using the aforementioned nematic liquid crystal composition. This liquid crystal display element includes a pair of polarizing plates 1 placed parallel to each other, transparent substrates 2 with electrical insulation placed inside of these polarizing plates 1, transparent electrodes 3 (or transparent electrodes with an active element) placed inside of these transparent substrates 2, and alignment layers 4 placed inside of these transparent electrodes 3. A liquid crystal 5 is filled between this pair of alignment layers 4, and liquid crystal molecules are aligned in a direction under the action of alignment layers 4. The aforementioned effects can be obtained by using the aforementioned liquid crystal composition as the liquid crystal 5.

A liquid crystal display element of the present invention is not limited by the structure of the illustration, and other conventionally known elements can be added, or a part of the elements of the illustration can be substituted by other elements.

EXAMPLES

The following examples further illustrate the present invention in detail, while the present invention is not limited to these examples. Also, "%" is referred to as "% by mass" in the compositions of the following examples and the comparative examples.

In the examples, the measured characteristics are as follows.

$T_{\to N-1}$: A phase transition temperature of a nematic phase to an isotropic phase is referred to as an upper temperature limit (° C.) of a liquid crystalline phase.

$T_{\to N}$: A phase transition temperature of a solid or smectic phase to a nematic phase is referred to as a lower temperature limit (° C.) of a liquid crystalline phase.

$\Delta T$: a temperature range of a nematic liquid crystalline phase, $|T_{N-1} - T_{\to N}|$ $\Delta n$: a birefringence measured at 25° C.

Vth: a threshold voltage (V) measured at 25° C. in the case of constructing a TN-LCD with a cell thickness of 6 μm η: a viscosity (mPa·s) measured at 20° C.

The following abbreviations are used in the description of compounds.

n (number) of ends $C_n H_{2n+1}$—
C a trans-1,4-cyclohexylene group
P a 1,4-phenylene group
E —COO—
e —OCO—
A —CH$_2$CH$_2$—
t —C≡C—
CN —C≡N
On —OC$_n$H$_{2n+1}$—
F —F
f a fluorine atom connected at an ortho position of an end group
ndm—$C_nH_{2n+1}$—CH=CH—(CH$_2$)$_{m-1}$—
—O(dm)n —O(CH$_2$)$_{m-2}$—CH=CH—$C_nH_{2n+1}$

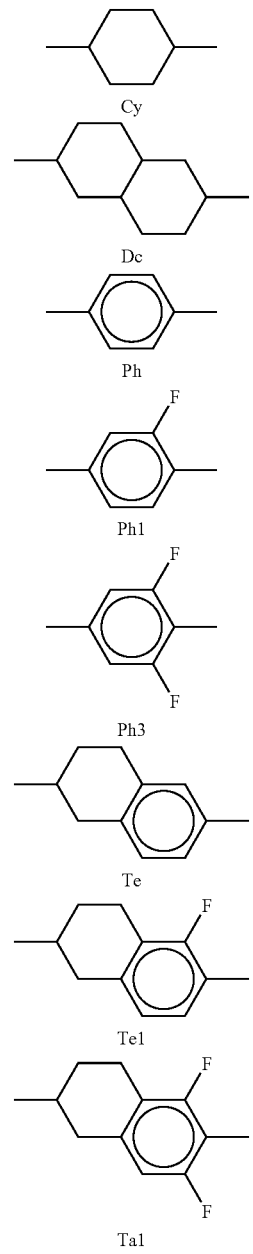

Cy

Dc

Ph

Ph1

Ph3

Te

Te1

Ta1

-continued

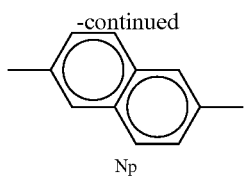

Np

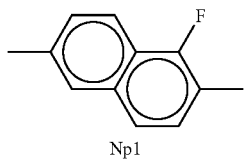

Np1

-continued

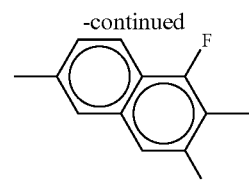

Na4

Examples 1, 2, 3, 4, 5, 6, and 7

Preparation of Liquid Crystal Composition

The nematic liquid crystal compositions below, example 1 (No. 1), example 2 (No. 2), example 3 (No. 3), example 4 (No. 4), example 5 (No. 5), example 6 (No. 6), and example 7 (No. 7), were prepared, and their physical characteristics were measured. The results are shown in Table 1.

TABLE 1

| | | Examples 1, 2, 3, 4, 5, 6, and 7 | | | | | | |
|---|---|---|---|---|---|---|---|---|
| | | No. 1 | No. 2 | No. 3 | No. 4 | No. 5 | No. 6 | No. 7 |
| (I) | 5-Cy-Cy-OCFFF | 15% | 17% | 20% | 18% | 15% | 10% | 15% |
| | 3-Cy-Cy-Cy-OCFFF | — | — | — | 5% | — | — | — |
| (II) | 0d1-Cy-Cy-5 | 15% | 20% | 22% | 22% | 20% | 20% | 20% |
| | 3-Cy-E-Cy-Cy-3 | 5% | 5% | 3% | — | 5% | 5% | 5% |
| | 3-Cy-E-Cy-Cy-4 | 5% | — | — | — | — | — | — |
| | 3-Cy-Cy-E-Ph-Cy-3 | — | 5% | — | — | 5% | 5% | 5% |
| | 3-Cy-Cy-E-Ph-Cy-4 | — | 5% | — | — | — | — | — |
| (III) | 2-Dc-Ph1-F | — | 14% | 10% | 10% | 15% | 20% | 10% |
| | 3-Cy-Dc-CFFF | — | — | — | — | — | — | 5% |
| (IV) | 2-Cy-A-Cy-Cy-Ph1-F | 4% | — | 5% | 5% | 5% | 5% | 5% |
| | 3-Cy-A-Cy-Cy-Ph1-F | 4% | — | 5% | 5% | 5% | 5% | — |
| | 4-Cy-A-Cy-Cy-Ph1-F | — | — | — | — | — | — | — |
| | 3-Cy-A-Cy-Cy-Ph3-F | 4% | — | — | — | — | — | — |
| | 5-Cy-A-Ph-F | 15% | — | — | — | — | — | — |
| | 2-Cy-Cy-Ph3-F | 10% | 10% | 10% | 10% | 10% | 10% | 10% |
| | 3-Cy-Cy-Ph3-F | 10% | 10% | 10% | 10% | 10% | 10% | 10% |
| | 4-Cy-Cy-Ph3-F | 3% | 5% | — | — | — | — | — |
| | 3-Cy-Cy-E-Ph3-F | 10% | 9% | 15% | 15% | 10% | 10% | 15% |
| $T_{N-1}$ (□) | | 80 | 80 | 80 | 82 | 84 | 82 | 81 |
| $T_{\to N}$ (□) | | -20 | -22 | -30 | -25 | -40 | -53 | -43 |
| $\Delta T$ | | 100 | 102 | 110 | 107 | 124 | 135 | 124 |
| $\Delta n$ | | 0.063 | 0.062 | 0.062 | 0.063 | 0.063 | 0.063 | 0.061 |
| Vth (V) | | 1.69 | 1.65 | 1.61 | 1.62 | 1.65 | 1.62 | 1.66 |
| $\eta$ (mPa·s) | | 18.8 | 19.0 | 17.6 | 18.2 | 18.4 | 19.2 | 18.6 |

As shown in Table 1, nematic liquid crystal compositions of examples 1, 2, 3, 4, 5, 6, and 7 were found to have a low lower temperature limit ($T_{\to N}$) and a high upper temperature limit ($T_{N-1}$) of a liquid crystalline phase, that is, a broad temperature range of a liquid crystalline phase, a small birefringence, a low threshold voltage, and a low viscosity.

A TFT liquid crystal display element with an excellent display characteristics was able to be produced using this nematic liquid crystal composition.

Comparative Examples 1, 2, 3, 4, 5, and 6

Nematic liquid crystal compositions of comparative example 1 (R1), comparative example 2 (R2), comparative example 3 (R3), comparative example 4 (R4), comparative example 5 (R5), and comparative example 6 (R6) were prepared. Their physical characteristics are shown in Table 1.

The nematic liquid crystal composition of comparative example 3, which includes a compound containing a trifluoromethoxycyclohexyl group and is the liquid crystal compound disclosed in Patent Document 3, has a small birefringence (Δn), similar to those in the examples. However, the temperature range of a liquid crystalline phase is as small as 66° C. since $T_{\to N}$ is as high as 0° C., and the deposition of a crystal occurred at 20° C. so that a viscosity was unable to be measured. Also, Vth is as high as 1.91 V. Therefore, it was found that comparative example 3 was apparently poor compared with the examples.

The nematic liquid crystal composition of comparative example 4, which includes a compound containing a trifluoromethoxycyclohexyl group and a condensed ring-type compound and is the liquid crystal compound disclosed in Patent Document 1, has a small birefringence (Δn) and a low Vth of

TABLE 2

Comparative examples 1, 2, 3, 4, 5, and 6

| | | R1 | R2 | R3 | R4 | R5 | R6 |
|---|---|---|---|---|---|---|---|
| (I) | 3-Cy-Cy-0CFFF | — | — | — | 15% | — | — |
| | 5-Cy-Cy-0CFFF | — | — | 10% | 22% | — | 15% |
| (II) | 0d1-Cy-Cy-5 | 20% | 20% | 20% | — | 20% | — |
| | 0d3-Cy-Cy-3 | 20% | 20% | 20% | — | 10% | — |
| | 3-Cy-Cy-0l | 10% | — | — | — | — | — |
| | 3-Cy-A-Cy-3 | — | — | — | — | 15% | — |
| | 3-Cy-E-Cy-Cy-3 | 5% | 5% | 5% | — | — | — |
| | 3-Cy-E-Cy-Cy-4 | — | 5% | 5% | — | — | — |
| | 3-Cy-Cy-E-Ph-Cy-3 | 5% | — | — | — | — | — |
| (III) | 2-Dc-Ph1-F | — | 10% | — | 11% | 17% | 25% |
| | 3-Ta1-Ph3-F | — | — | — | 10% | — | — |
| | 2-Cy-Dc-Ph1-F | — | — | — | 17% | 25% | 40% |
| | 3-Cy-Dc-Ph1-F | — | — | — | — | — | 20% |
| (IV) | 2-Cy-A-Cy-Cy-Ph1-F | — | — | — | 10% | 5% | — |
| | 3-Cy-A-Cy-Cy-Ph1-F | — | — | — | 10% | 4% | — |
| | 4-Cy-A-Cy-Cy-Ph1-F | — | — | — | 5% | 4% | — |
| | 2-Cy-Cy-Ph3-F | 10% | 10% | 10% | — | — | — |
| | 3-Cy-Cy-Ph3-F | 10% | 10% | 10% | — | — | — |
| | 4-Cy-Cy-Ph3-F | 10% | 10% | 10% | — | — | — |
| | 3-Cy-Cy-E-Ph3-F | 10% | 10% | 10% | — | — | — |
| $T_{N-1}$ (° C.) | | +90 | +81 | +86 | +74 | +90 | +86 |
| $T_{\to N}$ (° C.) | | +23 | −4 | +20 | 0 | −23 | −46 |
| ΔT | | 67 | 85 | 66 | 74 | 113 | 132 |
| Δn | | 0.062 | 0.061 | 0.061 | 0.063 | 0.061 | 0.067 |
| Vth (V) | | 2.08 | 1.82 | 1.91 | 1.40 | 2.27 | 1.53 |
| η (mPa·s) | | Deposition | 15.3 | Deposition | 37.2 | 19.6 | 55.2 |

Deposition: A viscosity was unable to be measured due to the deposition of a crystal.

The nematic liquid crystal composition of comparative example 1, which does not include a compound containing a trifluoromethoxycyclohexyl group, has a small birefringence (Δn) and a high $T_{N-1}$ of +90° C., similar to those in the examples. However, the temperature range of a liquid crystalline phase is as narrow as 67° C. since $T_{\to N}$ is as high as +23° C., and the deposition of a crystal occurred at 20° C. so that the viscosity was unable to be measured. Also, Vth is as high as 2.08 V. Therefore, it was found that comparative example 1 was apparently poor compared with the examples.

The nematic liquid crystal composition of comparative example 2, which includes no compound containing a trifluoromethoxycyclohexyl group but a condensed ring-type compound, has a small birefringence (Δn) and a low viscosity of 15.3 mPa·s, similar to those in the examples. However, the temperature range of a liquid crystalline phase is as small as 85° C. since $T_{\to N}$ is as high as −4° C., and Vth is as high as 1.82 V. Therefore, it was found that comparative example 2 was apparently poor compared with the examples.

1.40 V, similar to those in the examples. However, a temperature range of a liquid crystalline phase is as small as 74° C. since $T_{\to N}$ is as high as 0° C., and a viscosity is as high as 37.2 mPa·s. Therefore, it was found that comparative example 4 was apparently poor compared with the examples.

The nematic liquid crystal composition of comparative example 5 has a small birefringence (Δn), a high $T_{N-1}$ of +90° C., a low $T_{\to N}$ of −23° C., and a wide temperature range of a liquid crystalline phase of 113° C., similar to those in the examples. However, Vth is as high as 2.27 V. Therefore, it was found that comparative example 5 was poor compared with the examples.

The nematic liquid crystal composition of comparative example 6 has a small birefringence (Δn), a high $T_{N-1}$ of +86° C., a low $T_{\to N}$ of −46° C., a wide temperature range of a liquid crystalline phase of 132° C., and a low Vth of 1.53 V, similar to those in the examples. However, the viscosity is extremely high at 55.2 mPa·s. Therefore, it was found that comparative example 6 was poor compared with the examples.

INDUSTRIAL APPLICABILITY

A nematic liquid crystal composition of the present invention has a broad temperature range of a liquid crystalline phase, a low threshold voltage, a low viscosity, and a small birefringence. Therefore, this liquid crystal composition can be used as a constituent member of an active matrix liquid crystal display element, specifically a reflective or semi-transmissive liquid crystal display element, thereby enabling a display element with excellent display characteristics to be provided.

The invention claimed is:

1. A nematic liquid crystal composition comprising:
at least one of liquid crystal compounds containing a trans-4-trifluoromethoxycyclohexyl group in a backbone, in which the number of an intramolecular cyclohexane ring is 2;
at least one of compounds in which dielectric anisotropy (Δε) is less than 1 in absolute value; and
at least one selected from liquid crystal compounds containing a naphthalene-2,6-diyl group, a decahydronaphthalene-2,6-diyl group, or a 1,2,3,4-tetrahydronaphthalene-2,6-diyl group in a backbone, in which Δε is 1 or more in absolute value, and a liquid crystal compound in which the number of a six-membered ring is 2 to 4, and Δε is 1 or more in absolute value, wherein
a birefringence is in the range of 0.05 to 0.1, a viscosity is 25 mPa·s or less at 20° C., a threshold voltage is 1.9 V or less at 25° C., and a difference between an upper temperature limit and a lower temperature limit of a liquid crystalline phase is 80° C. or more, and
the compound containing the trans-4-trifluoromethoxycyclohexyl group is represented by general formula (I):

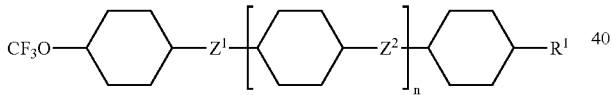

(wherein $R^1$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, and $Z^1$ and $Z^2$ independently represent —COO—, —OCO—, —CH$_2$=CH$_2$—, —CH$_2$CH$_2$—, or a single bond, and n represents a number of 0), and
the compound in which Δε is less than 1 in absolute value is represented by general formula (II):

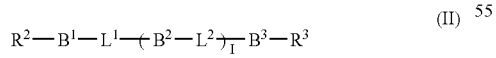

(wherein $R^2$ and $R^3$ independently represent a hydrogen atom, an alkyl group having 1 to 15 carbon atoms, an alkyl group having 1 to 15 carbon atoms substituted by at least one halogen, an alkenyl group having 2 to 15 carbon atoms, or an alkenyl group having 2 to 15 carbon atoms substituted by at least one halogen, in which one or two or more of a CH$_2$ group can independently be substituted by an oxygen atom, a sulfur atom, —CO—, —COO—, —OCO—, or —OCO—O— provided that oxygen atoms never connect to each other, $B^1$, $B^2$, and $B^3$ independently represent
(a) a trans-1,4-cyclohexylene group (in which a CH$_2$ group or two or more non-adjacent CH$_2$ groups can be substituted by an oxygen atom or a sulfur atom)
(b) a 1,4-phenylene group (in which a CH$_2$ group or two or more non-adjacent CH$_2$ groups can be substituted by a nitrogen atom)
(c) a group selected from the group consisting of a 1,4-cyclohexenylene group, a 1,4-bicyclo(2.2.2)octylene group, a piperidine-1,4-diyl group, a naphthalene-2,6-diyl group, a decahydronaphthalene-2,6-diyl group, and a 1,2,3,4-tetrahydronaphthalene-2,6-diyl group,
groups (a), (b), and (c) can be substituted by a halogen,
l represents 0 or 1, and
$L^1$ and $L^2$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond).

2. A nematic liquid crystal composition according to claim 1, wherein
the compound in which Δε is 1 or more in absolute value is a compound selected from the group consisting of compounds represented by general formulae (IIIa), (IIIb), (IIIc), and (IV):

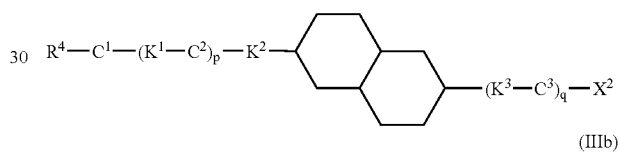

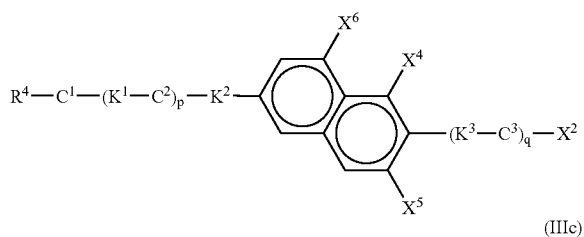

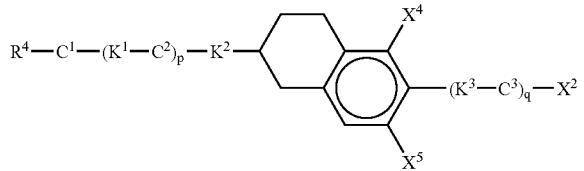

(wherein $R^4$ represents an alkyl group having 1 to 10 carbon atoms, an alkoxyl group having 1 to 10 carbon atoms, and an alkenyl group having 2 to 10 carbon atoms, or an alkenyloxy group having 2 to 10 carbon atoms, and $C^1$, $C^2$, and $C^3$ independently represent
(d) a trans-1,4-cyclohexylene group (in which a CH$_2$ group or two or more non-adjacent CH$_2$ groups can be substituted by an oxygen atom or a sulfur atom)
(e) a 1,4-phenylene group (in which a CH$_2$ group or two or more non-adjacent CH$_2$ groups can be substituted by a nitrogen atom)
(f) a group selected from the group consisting of a 1,4-cyclohexenylene group, a 1,4-bicyclo (2.2.2)octylene group, a piperidine-1,4-diyl group, a naphthalene-2,6-diyl group, a 1,2,3,4-tetrahydronaphthalene-2,6-diyl group, and a decahydronaphthalene-2,6-diyl group,
groups (d), (e), and (f) can be substituted by a halogen, $K^1$, $K^2$, and $K^3$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond, $X^4$, $X^5$, and $X^6$ independently represent a hydrogen atom or a fluorine atom, p and q independently represent 0 or 1, and $X^2$ represents a hydrogen atom, a fluorine atom, a chlorine atom, a cyano group, a trifluoromethyl group, a difluoromethyl group, a fluoromethoxy group, a difluoromethoxy group, a trifluoromethoxy group, 2,2,2-trifluoroethyl group, or the same definition as $R^4$)

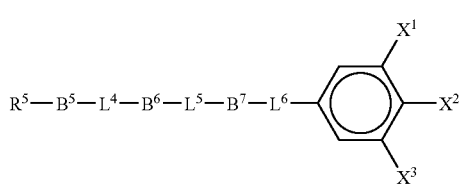

(wherein $R^6$ represent a hydrogen atom, an alkyl group having 1 to 15 carbon atoms, an alkyl group having 1 to 15 carbon atoms substituted by at least one halogen, an alkenyl group having 2 to 15 carbon atoms, or an alkenyl group having 2 to 15 carbon atoms substituted by at least one halogen, in which one or two or more of a CH$_2$ group can independently be substituted by an oxygen atom, a sulfur atom, —CO—, —COO—, —OCO—, or —OCO—O—provided that oxygen atoms never connect to each other, and $B^5$, $B^6$, and $B^7$ independently represent a group selected from the group consisting of (g) a trans-1,4-cyclohexylene group (in which a CH$_2$ group or two or more non-adjacent CH$_2$ groups can be substituted by an oxygen atom or a sulfur atom) and (h) a 1,4-phenylene group (in which a CH$_2$ group or two or more non-adjacent CH$_2$ groups can be substituted by a nitrogen atom), the groups (g) and (h) can be substituted by a cyano group and a halogen, $L^4$, $L^5$, and $L^6$ independently represent —COO—, —OCO—, —CH$_2$O—, —OCH$_2$—, —CH$_2$CH$_2$—, —CH=CH—, —C≡C—, —(CH$_2$)$_4$—, —CH=CH—CH$_2$CH$_2$—, —CH$_2$CH$_2$—CH=CH—, or a single bond, $X^1$ and $X^3$ independently represent a hydrogen atom or a fluorine atom, and $X^2$ represents a hydrogen atom, a fluorine atom, a chlorine atom, a cyano group, a trifluoromethyl group, difluoromethyl group, fluoromethoxy group, a difluoromethoxy group, a trifluoromethoxy group, 2,2,2-trifluoroethyl group, or the same definition as $R^5$).

3. A liquid crystal composition according to claim 1, wherein $Z^1$ and $Z^2$ independently represent a single bond or —CH$_2$CH$_2$—.

4. A liquid crystal composition according to claim 2 comprising the compound selected from the group consisting of the compounds represented by general formulae (IIIa), (IIIb), and (IIIc).

5. A liquid crystal composition according to claim 2 comprising the compound represented by general formula (IV).

6. A liquid crystal composition according to claim 2 comprising at least one compound selected from the group consisting of the compounds represented by general formulae (IIIa), (IIIb), and (IIIc) and at least one compound represented by general formula (IV).

7. A liquid crystal composition according to claim 1, wherein a content of the compound represented by general formula (I) is 5 to 50% by mass, and a content of the compound represented by general formula (II) is 5 to 50% by mass.

8. A liquid crystal composition according to claim 4, wherein a content of the compound selected from the group consisting of the compounds represented by general formulae (IIIa), (IIIb), and (IIIc) is 5 to 60% by mass.

9. A liquid crystal composition according to claim 5, wherein a content of the compound represented by general formula (IV) is 5 to 50% by mass.

10. A liquid crystal composition according to claim 5, wherein a content of the compound represented by general formula (I) is 5 to 50% by mass, a content of the compound represented by general formula (II) is 5 to 50% by mass, a content of the compound selected from the group consisting of the compound represented by general formulae (IIIa), (IIIb), and (IIIc) is 5 to 60% by mass, and a content of the compound represented by general formula (IV) is 5 to 50% by mass.

11. A liquid crystal display element using the liquid crystal composition according to claim 1.

12. An active matrix liquid crystal display element using the liquid crystal composition according to claim 1.

13. A reflective or semi-transmissive liquid crystal display element using the liquid crystal composition according to claim 1.

14. A liquid crystal composition according to claim 2, wherein a content of the compound represented by general formula (I) is 5 to 50% by mass, and a content of the compound represented by general formula (II) is 5 to 50% by mass.

15. A liquid crystal composition according to claim 6, wherein a content of the compound selected from the group consisting of the compounds represented by general formulae (IIIa), (IIIb), and (IIIc) is 5 to 60% by mass.

16. A liquid crystal composition according to claim 6, wherein a content of the compound represented by general formula (IV) is 5 to 50% by mass.

* * * * *